(12) United States Patent
Jeon et al.

(10) Patent No.: US 8,860,895 B2
(45) Date of Patent: Oct. 14, 2014

(54) STEREOSCOPIC IMAGE DISPLAY

(75) Inventors: Il Jeon, Bucheon-si (KR); Kyeongjin Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 51 days.

(21) Appl. No.: 13/312,710

(22) Filed: Dec. 6, 2011

(65) Prior Publication Data

US 2012/0147301 A1    Jun. 14, 2012

(30) Foreign Application Priority Data

Dec. 10, 2010   (KR) .................. 10-2010-0126027

(51) Int. Cl.
| | | |
|---|---|---|
| G02F 1/1335 | (2006.01) | |
| H04N 13/04 | (2006.01) | |
| G02B 27/22 | (2006.01) | |
| G02B 27/26 | (2006.01) | |
| G02F 1/13363 | (2006.01) | |

(52) U.S. Cl.
CPC ........ *H04N 13/0434* (2013.01); *G02B 27/2242* (2013.01); *G02B 27/26* (2013.01); *G02F 1/133528* (2013.01); *G02F 2001/133562* (2013.01); *G02F 2001/133631* (2013.01)

USPC .............................................. 349/15; 349/118

(58) Field of Classification Search
USPC .......................................... 349/15, 117–121
See application file for complete search history.

(56) References Cited

U.S. PATENT DOCUMENTS

| | | | |
|---|---|---|---|
| 7,492,515 B2 * | 2/2009 | Hamagishi et al. | 359/465 |
| 2006/0098146 A1 * | 5/2006 | Yano et al. | 349/118 |
| 2009/0040401 A1 * | 2/2009 | Tamura et al. | 349/15 |

FOREIGN PATENT DOCUMENTS

| | | |
|---|---|---|
| CN | 1873471 A | 12/2006 |
| CN | 101363981 A | 2/2009 |
| CN | 101609178 A | 12/2009 |
| KR | 10-2008-0002759 A | 1/2008 |

* cited by examiner

*Primary Examiner* — Charles Chang
(74) *Attorney, Agent, or Firm* — McKenna Long & Aldridge LLP

(57) ABSTRACT

A stereoscopic image display includes a display panel, a first polarizing plate positioned on an upper surface of the display panel, a patterned retarder positioned on the first polarizing plate, a first cellulose triacetate (TAC) film positioned on the patterned retarder, a second polarizing plate positioned on a lower surface of the display panel, and a second TAC film positioned under the second polarizing plate.

8 Claims, 12 Drawing Sheets

STEREOSCOPIC IMAGE DISPLAY

This application claims the benefit of Korean Patent Application No. 10-2010-0126027 filed on Dec. 10, 2010, which is incorporated herein by reference for all purposes as if fully set forth herein.

BACKGROUND OF THE INVENTION

1. Field of the Invention

Embodiments of the invention relate to a stereoscopic image display, and more particularly, to a stereoscopic image display in which a patterned retarder and a polarizing plate form an integral body.

2. Discussion of the Related Art

A stereoscopic image display implements a stereoscopic image using a stereoscopic technique or an autostereoscopic technique.

The stereoscopic technique, which uses a parallax image between left and right eyes of a user with a high stereoscopic effect, includes a glasses type method and a non-glasses type method, both of which have been put to practical use. In the glasses type method, the parallax image between the left and right eyes is displayed on a direct-view display or a projector through a change in a polarization direction of the parallax image or in a time division manner, and thus the user views a stereoscopic image using polarization glasses or liquid crystal shutter glasses. In the non-glasses type method, an optical plate such as a parallax barrier for separating an optical axis of the parallax image between the left and right eyes is generally installed in front of or behind a display screen.

FIGS. 1 and 2 illustrate a related art stereoscopic image display.

As shown in FIG. 1, a glasses type stereoscopic image display may include a polarizing plate 120 on a display panel 100 and a patterned retarder 130 for converting polarization characteristics of light incident on polarization glasses 140. The glasses type stereoscopic image display alternately displays a left eye image L and a right eye image R on the display panel 100 and converts the polarization characteristics of light incident on the polarization glasses 140 using the patterned retarder 130. Hence, the glasses type stereoscopic image display spatially separates the left eye image L and the right eve image R, thereby implementing a stereoscopic image.

As shown in FIG. 2, in the glasses type stereoscopic image display, a first cellulose triacetate (TAC) film 110a is positioned on the display panel 100, and the polarizing plate 120 is positioned on the first TAC film 110a. Further, a second TAC film 110b is positioned on the polarizing plate 120, the patterned retarder 130 is positioned on the second TAC film 110b, and a third TAC film 110c is positioned on the patterned retarder 130.

However, in the related art stereoscopic image display shown in FIGS. 1 and 2, because the first and second TAC films 110a and 110b are respectively positioned on and under the polarizing plate 120, the manufacturing cost increases. Further, a crosstalk is generated because of an increase in a thickness of the stereoscopic image display.

SUMMARY OF THE INVENTION

Embodiments of the invention provide a stereoscopic image display capable of reducing the manufacturing cost and preventing the generation of a crosstalk.

In one aspect, there is a stereoscopic image display comprising a display panel, a first polarizing plate positioned on an upper surface of the display panel, a patterned retarder positioned on the first polarizing plate, a first cellulose triacetate (TAC) film positioned on the patterned retarder, a second polarizing plate positioned on a lower surface of the display panel, and a second TAC film positioned under the second polarizing plate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Example embodiments of the invention will be described with reference to FIGS. 3 to 11B.

Figure 3:
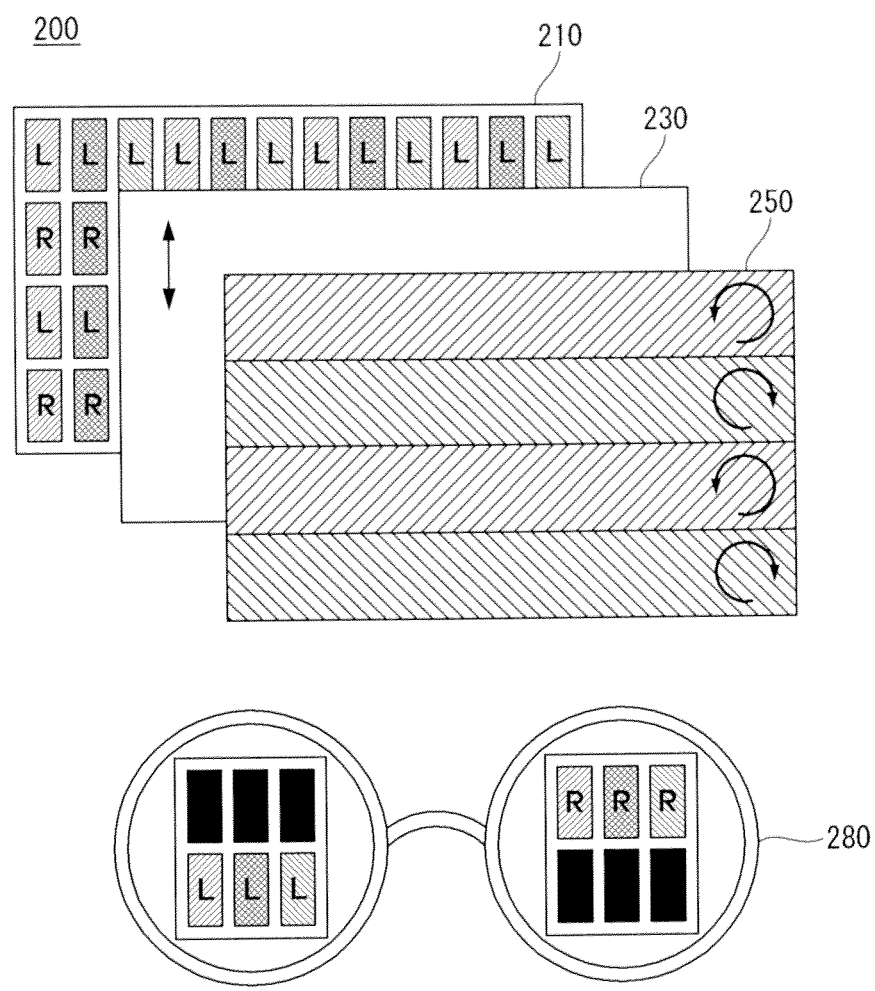
FIG. 3 illustrates a stereoscopic image display according to an example embodiment of the invention.

FIG. 3 illustrates a stereoscopic image display according to an example embodiment of the invention.

As shown in FIG. 3, a stereoscopic image display 200 according to an example embodiment of the invention includes a display panel 210, a first polarizing plate 230, a patterned retarder 250, and polarization glasses 280.

The display panel 210 may be implemented as a display panel of a flat panel display such as a liquid crystal display (LCD), a field emission display (FED), a plasma display panel (PDP), and an electroluminescence device (EL). In the following description, the stereoscopic image display according to the embodiment of the invention is described using a display panel of the liquid crystal display as the display panel 210.

The stereoscopic image display 200 further includes a backlight unit (not shown) disposed in the rear of the display panel 210 and a second polarizing plate (not shown) disposed between the display panel 210 and the backlight unit. The patterned retarder 250 and the polarization glasses 280 are driving elements of a stereoscopic image and spatially separate a left eye image and a right eye image, thereby making a binocular disparity.

The display panel 210 includes a lower glass substrate, an upper glass substrate, and a liquid crystal layer interposed between the lower glass substrate and the upper glass substrate. A thin film transistor (TFT) array is formed on the lower glass substrate. The TFT array includes a plurality of data lines to which R (red), G (green), and B (blue) data voltages are supplied, a plurality of gate lines (or scan lines) which cross the data lines and receive a gate pulse (or scan pulse), a plurality of TFTs formed at crossings of the data lines and the gate lines, a plurality of pixel electrodes for charging liquid crystal cells to the data voltage, a plurality of storage capacitors that are connected to the pixel electrodes and uniformly hold a voltage of the liquid crystal cells, and the like.

A color filter array is formed on the upper glass substrate. The color filter array includes black matrixes, color filters, and the like. In a vertical electric field driving manner such as a twisted nematic (TN) mode and a vertical alignment (VA) mode, common electrodes, which are disposed opposite the pixel electrodes and form an electric filed along with the pixel electrodes, are formed on the upper glass substrate. In a horizontal electric field driving manner such as an in-plane switching (IPS) mode and a fringe field switching (FFS) mode, the common electrodes are formed on the lower glass substrate along with the pixel electrodes.

The first polarizing plate 230 is attached to the upper glass substrate and the second polarizing plate is attached to the lower glass substrate. Alignment layers for setting pre-tilt angles of liquid crystals are respectively formed in the inner surfaces contacting the liquid crystal layer in the upper and lower glass substrates. A column spacer may be formed between the upper and lower glass substrates to keep cell gaps of the liquid crystal cells constant.

A left eye image L and a right eye image R are alternately displayed on the display panel 210 line by line.

The first polarizing plate 230 is an analyzer attached to the upper glass substrate of the display panel 210 and transmits only linearly polarized light among light passing through the liquid crystal layer of the display panel 210.

The patterned retarder 250 includes first retarder patterns and second retarder patterns, which are alternately disposed line by line. It is preferable that the first and second retarder patterns are alternately disposed line by line so that they form an angle of 45° and −45° with an absorption axis of the first polarizing plate 230.

Each of the first and second retarder patterns retards a phase of light by λ/4 using a birefringence medium, where λ is a wavelength. An optical axis of the first retarder pattern is perpendicular to an optical axis of the second retarder pattern.

Thus, the first retarder patterns are positioned opposite lines of the display panel 210, on which the left eye image L is displayed, and convert light of the left eye image L into a first polarization component (for example, circularly polarized light or linearly polarized light). The second retarder patterns are positioned opposite lines of the display panel 210, on which the right eye image R is displayed, and convert light of the right eye image R into a second polarization component (for example, circularly polarized light or linearly polarized light).

For example, the first retarder pattern may be implemented as a polarization filter transmitting left circularly polarized light, and the second retarder pattern may be implemented as a polarization filter transmitting right circularly polarized light.

A polarizing film passing through only the first polarization component is attached to a left eyeglass of the polarization glasses 280, and a polarizing film passing through only the second polarization component is attached to a right eyeglass of the polarization glasses 280. Thus, a user wearing the polarization glasses 280 views only the left eye image L through his or her left eve and views only the right eye image R through his/her right eye, thereby perceiving the image displayed on the display panel 210 as the stereoscopic image.

Figure 4:
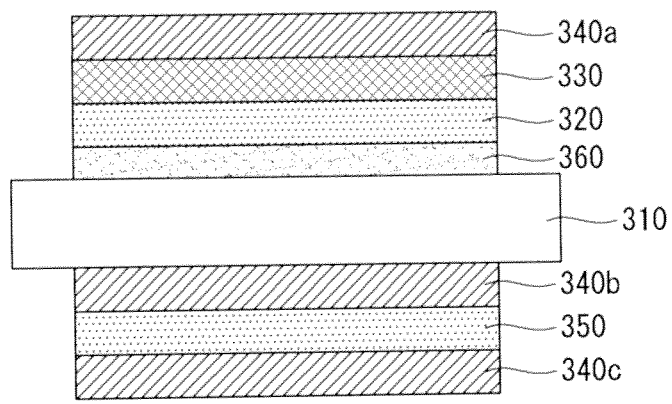
FIG. 4 illustrates a stereoscopic image display according to a first embodiment of the invention.

FIG. 4 illustrates a stereoscopic image display according to a first embodiment of the invention.

As shown in FIG. 4, a stereoscopic image display 300 according to a first embodiment of the invention includes a display panel 310, a first polarizing plate 320 positioned on an upper surface of the display panel 310, a patterned retarder 330 positioned on the first polarizing plate 320, and a first cellulose triacetate (TAC) film 340a positioned on the patterned retarder 330.

The stereoscopic image display 300 may further include a second TAC film 340b positioned on a lower surface of the display panel 310, a second polarizing plate 350 positioned under the second TAC film 340b, and a third TAC film 340c positioned under the second polarizing plate 350.

Each of the first polarizing plate 320 and the second polarizing plate 350 absorbs one component of white light of a non-polarized state and transmits another component perpendicular to the one component, due to a conjugated structure of an oriented dichroic material or a conjugated structure of oriented polymer chains.

The first polarizing plate 320 and the second polarizing plate 350 may be formed of using an iodide-based polarizing film, a dye-based polarizing film, and a polyene-based polarizing film. Other materials may be used. The iodide-based polarizing film is oriented by polyvinyl alcohol (PVA) chains obtained by stretching and orienting polyiodide chains, thereby representing polarization. The dye-based polarizing film is oriented by PVA chains obtained by stretching and orienting a dichroic dye, thereby representing polarization. The polyene-based polarizing film produces polyene by a dehydration reaction of a PVA film or a reaction for removing hydrochloric acid of a PVC film, thereby representing polarization.

Each of the first polarizing plate 320 and the second polarizing plate 350 has an absorption axis and a polarization axis. The absorption axis is an axis obtained by stretching and orienting the polyiodide chains. In other words, the absorption axis allows one of two vertical components of light vibrating in any direction to interact with electrons of the first and second polarizing plates 320 and 350 and removes the component of light in a process for converting electrical energy of the light into electron energy. The polarization axis is vertical to the absorption axis and transmits light vibrating in a direction of the polarization axis.

The first TAC film 340a is positioned on an upper surface of the patterned retarder 330, the second TAC film 340b is positioned on the lower surface of the display panel 310, and the third TAC film 340c is positioned on a lower surface of the second polarizing plate 350.

The first TAC film 340a, the second TAC film 340b, and the third TAC film 340c support the first and second polarizing plates 320 and 350, protect the first and second polarizing plates 320 and 350 and the patterned retarder 330 from an external impact, and improve durability, moisture resistance, and mechanical strength of the stereoscopic image display.

More specifically, the first TAC film 340a positioned on the upper surface of the patterned retarder 330 protects the first polarizing plate 320 and the patterned retarder 330 from the external impact. Thus, the first TAC film 340a may go through a hard coating process for increasing the surface hardness, an anti-glare process for preventing reflection of light from the outside and preventing a reduction in visibility resulting from the light reflection, and a surface process including an anti-reflection process or a low-reflection processing.

An adhesive layer 360 may be interposed between the first polarizing plate 320 and the display panel 310. The adhesive layer 360 is used to attach the first polarizing plate 320 to the display panel 310. The adhesive layer 360 may be generally implemented as a pressure sensitive adhesive (PSA). For example, the adhesive layer 360 may be formed using an adhesive composition including acrylic copolymer, which has high modulus of elasticity and excellent adhesive characteristic and reduces the generation of fine bubbles between the display panel 310 and the adhesive layer 360 to prevent the peeling of the adhesive layer 360. The adhesive layer 360 may protect the first polarizing plate 320 from an external impact because of its elasticity, in addition to an adhesive function.

In the embodiment of the invention, the patterned retarder 330 and the first polarizing plate 320 form an integral body. A method for forming the integral body of the patterned retarder 330 and the first polarizing plate 320 may include directly forming the patterned retarder 330 on the first polarizing plate 320 using the first polarizing plate 320 as a base film to form the integral body and then attaching the integral body to the display panel 310. Another method may include laminating the patterned retarder 330 on the first polarizing plate 320 to form the integral body and then attaching the integral body to the display panel 310. Other methods may be used.

Figure 1:
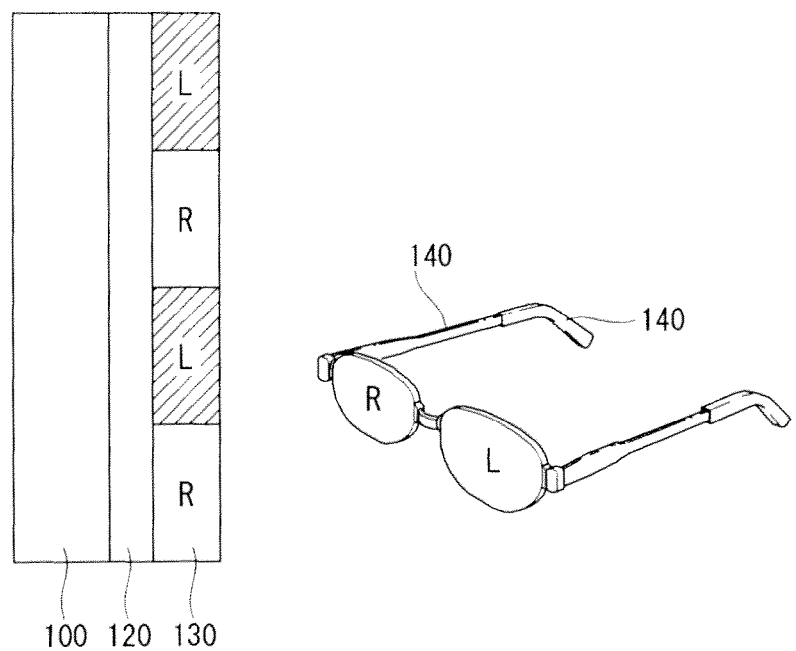
FIGS. 1 and 2 illustrate a related art stereoscopic image display.
Figure 2:
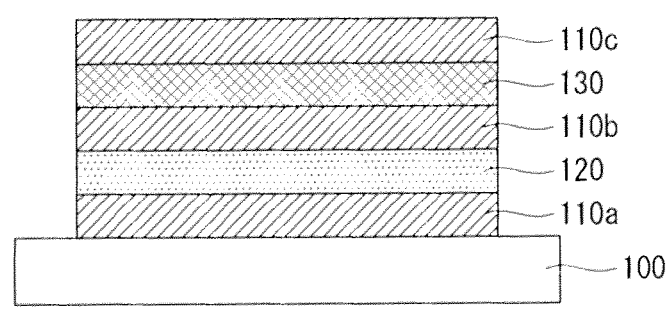

As described above, the stereoscopic image display according to the first embodiment of the invention may remove the two TAC films of the related art stereoscopic image display shown in FIG. 2 because of the integral body of the patterned retarder and the first polarizing plate. Hence, the manufacturing yield may be improved, and the manufacturing cost may be reduced. Further, because a thickness ranging from the display panel to the patterned retarder is reduced, a crosstalk may be reduced.

Figure 5:
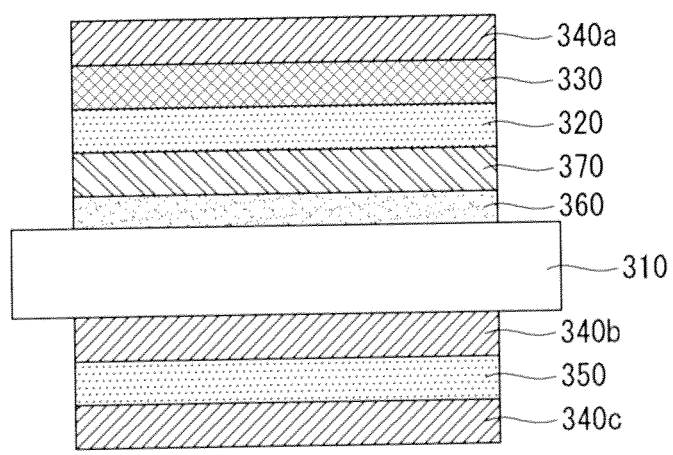
FIG. 5 illustrates a stereoscopic image display according to a second embodiment of the invention.

FIG. 5 illustrates a stereoscopic image display according to a second embodiment of the invention. Structures and components identical or equivalent to those illustrated in FIGS. 4 and 5 are designated with the same reference numerals, and a further description may be briefly made or may be entirely omitted.

As shown in FIG. 5, a stereoscopic image display 300 according to a second embodiment of the invention further includes a retardation film 370, as compared the stereoscopic image display 300 according to the first embodiment of the invention.

The retardation film 370 is positioned between an adhesive layer 360 and a first polarizing plate 320. The stereoscopic image display 300 according to the second embodiment of the invention may achieve a high contrast ratio and a wide viewing angle and may reduce a leakage of light in a black display state using the retardation film 370 having a single-layered structure.

Characteristics of TN liquid crystal cells in the black state are parameterized using LCD optical simulation program (for example, LCD Master and Techwiz LCD 1D) and are input and applied. The parameterized liquid crystals design optical characteristic of the retardation film in consideration of a polarization state implemented by Poincare sphere.

More specifically, the retardation film 370 is a negative biaxial film and has refractive indexes of nx, ny, and nz based on a spatial coordinate system. In general, optical characteristic of the retardation film 370 may be very easily obtained at a wavelength of about 550 nm when a wavelength of a light source is not mentioned. The optical characteristic of the retardation film 370 is defined by the refractive index.

Figure 6A:
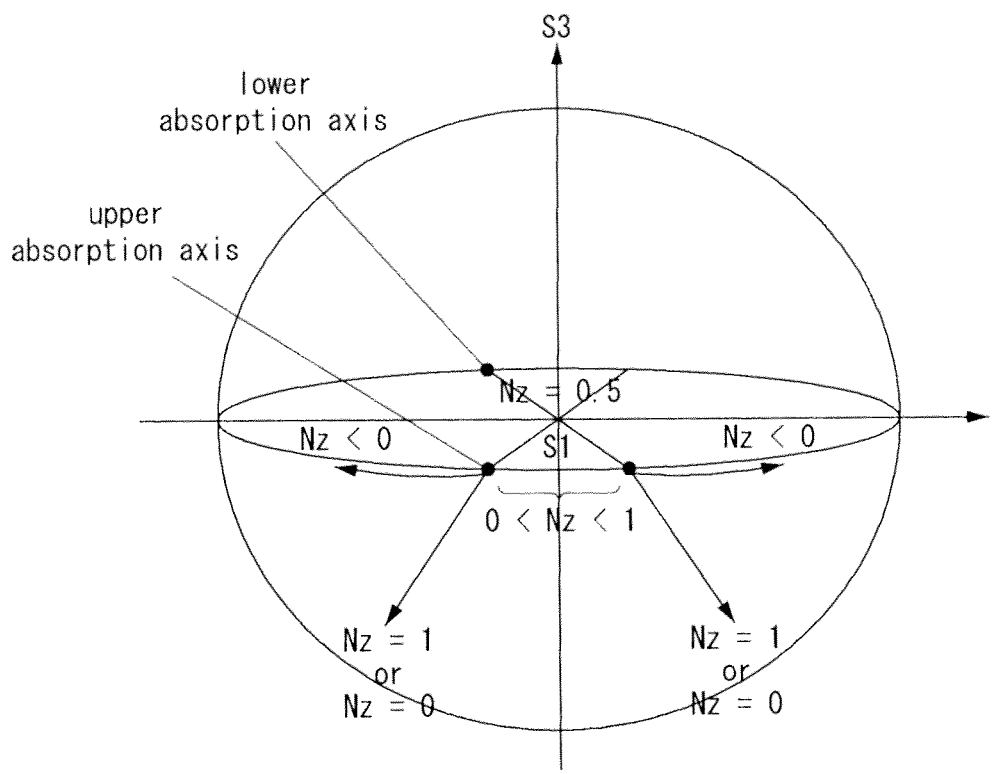
FIGS. 6A and 6B illustrate Poincare sphere for explaining a refractive index of a retardation film.
Figure 6B:
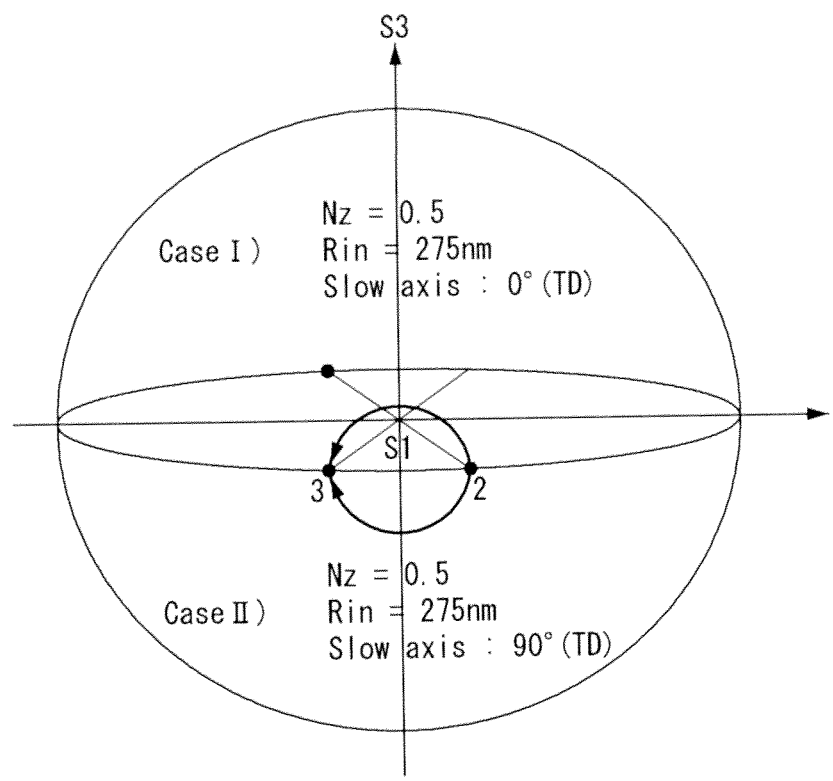

FIGS. 6A and 6B illustrate Poincare sphere for explaining a refractive index of a retardation film.

In FIGS. 6A and 6B, 'nx' is a refractive index of an axis having a maximum refractive index in the in-plane direction, 'ny' is a vertical direction of the refractive index nx in the in-plane direction, and 'nz' is a refractive index of a thickness direction.

The retardation film 370 may be represented by a retardation value Rin and the refractive index nz of the thickness direction as indicated in the following Equations 1 and 2. In the following Equation 2, 'd' is a thickness of the retardation film.

$$nz = \frac{nx - nz}{nz - ny} \qquad [\text{Equation 1}]$$

$$Rin = (nx - ny)d \qquad [\text{Equation 2}]$$

The retardation film 370 has a relationship of nx>nz>ny with respect to the refractive index, where 0<nz<1. Thus, the retardation value Rin and the refractive index nz of the thickness direction calculated by Equations 1 and 2 may be about 275 nm and about 0.5, respectively. The retardation film 370 is stretched in a transverse direction (i.e., TD direction and cross MD direction) and has an optical axis in the transverse direction.

The stereoscopic image display 300 according to the second embodiment of the invention includes the retardation film 370 of Z-plate, thereby achieving a wide viewing angle.

The stereoscopic image display 300 according to the second embodiment of the invention may be an ordinary mode (O-mode) in which an orientation axis of liquid crystals is parallel to an optical axis of the second polarizing plate 350 and is vertical to an optical axis of the first polarizing plate 320.

Accordingly, because the retardation film 370 is positioned between the display panel 310 and the first polarizing plate 320, light passing through the liquid crystals of the display panel 310 may be compensated by the retardation film 370.

As described above, the stereoscopic image display according to the second embodiment of the invention may remove the two TAC films of the related art stereoscopic image display shown in FIG. 2 because of the integral body of the patterned retarder and the first polarizing plate in the same manner as the first embodiment of the invention. Hence, the manufacturing yield may be improved, and the manufacturing cost may be reduced. Further, because a thickness ranging from the display panel to the patterned retarder is reduced, a crosstalk may be reduced.

Further, the stereoscopic image display according to the second embodiment of the invention further includes the retardation film, thereby widening the viewing angle.

Figure 7:
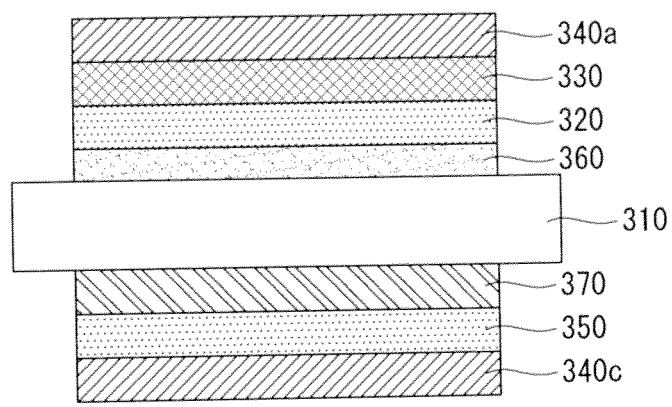
FIG. 7 illustrates a stereoscopic image display according to a third embodiment of the invention.

FIG. 7 illustrates a stereoscopic image display according to a third embodiment of the invention. Structures and components identical or equivalent to those illustrated in FIGS. 5 and 7 are designated with the same reference numerals, and a further description may be briefly made or may be entirely omitted.

As shown in FIG. 7, a stereoscopic image display 300 according to a third embodiment of the invention has the structure in which the retardation film 370 of the stereoscopic image display 300 according to the second embodiment of the invention is positioned on the second TAC film 340b and the second TAC film 340b is removed.

The stereoscopic image display 300 according to the third embodiment of the invention may be an extra ordinary (E-mode) in which an orientation axis of liquid crystals is vertical to an optical axis of a second polarizing plate 350 and is parallel to an optical axis of a first polarizing plate 320.

Accordingly, because the retardation 370 is positioned between the display panel 310 and the second polarizing plate 350, light passing through the second polarizing plate 350 may be compensated by the retardation film 370.

As described above, the stereoscopic image display according to the third embodiment of the invention may remove the two TAC films of the related art stereoscopic image display shown in FIG. 2 because of the integral body of the patterned retarder and the first polarizing plate in the same manner as the first and second embodiments of the invention. Hence, the manufacturing yield may be improved, and the manufacturing cost may be reduced. Further, because a thickness ranging from the display panel to the patterned retarder is reduced, a crosstalk may be reduced.

Further, the stereoscopic image display according to the third embodiment of the invention further includes the retardation film, thereby widening the viewing angle.

Figure 8A:
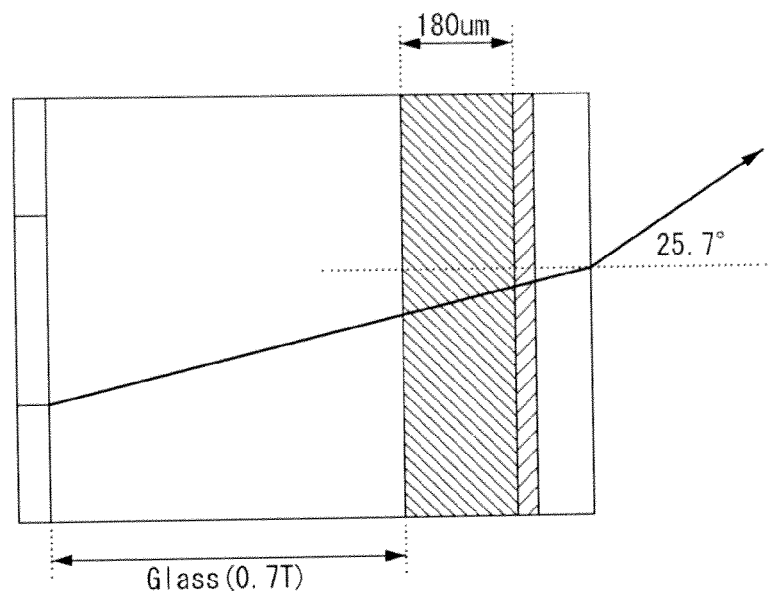
FIG. 8A illustrates a viewing angle of a related art stereoscopic image display.
Figure 8B:
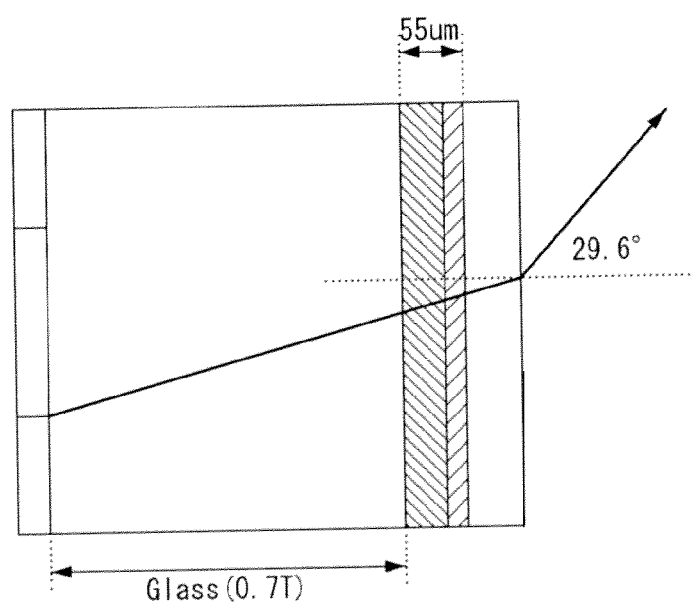
FIG. 8B illustrates a viewing angle of a stereoscopic image display according to example embodiments of the invention.

FIG. 8A illustrates a viewing angle of a related art stereoscopic image display, and FIG. 8B illustrates a viewing angle of a stereoscopic image display according to example embodiments of the invention. Further, FIG. 9A is a simulation graph of a viewing angle of a related art stereoscopic image display, and FIG. 9B is a simulation graph of a viewing angle of a stereoscopic image display according to example embodiments of the invention.

Figure 9A:
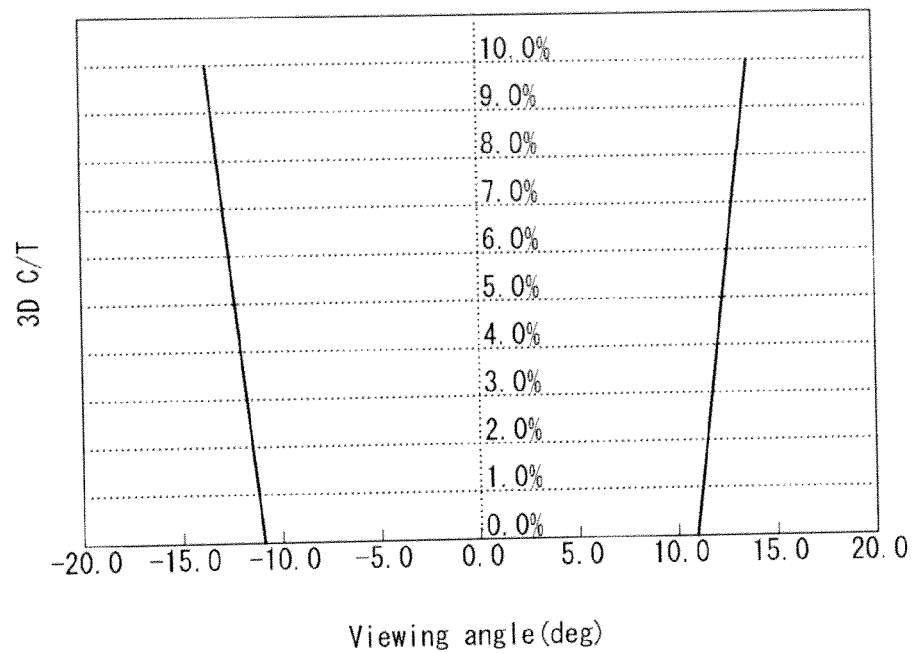
FIG. 9A is a simulation graph of a viewing angle of a related art stereoscopic image display.

As shown in FIGS. 8A and 9A, in the related art stereoscopic image display shown in FIG. 2, the adhesive layer, the first TAC film, the polarizing plate, and the second TAC film are sequentially positioned between the display panel and the patterned retarder. In the related art stereoscopic image display shown in FIG. 2, a thickness of the adhesive layer was about 25 μm, a thickness of the first TAC film was about 60 μm, a thickness of the polarizing plate was about 30 μm, and a thickness of the second TAC film was about 65 μm.

Thus, in the related art stereoscopic image display, a total thickness ranging from the display panel to the patterned retarder was about 175 μm, and a viewing angle obtained by the simulation result was about 25.7°.

Figure 9B:
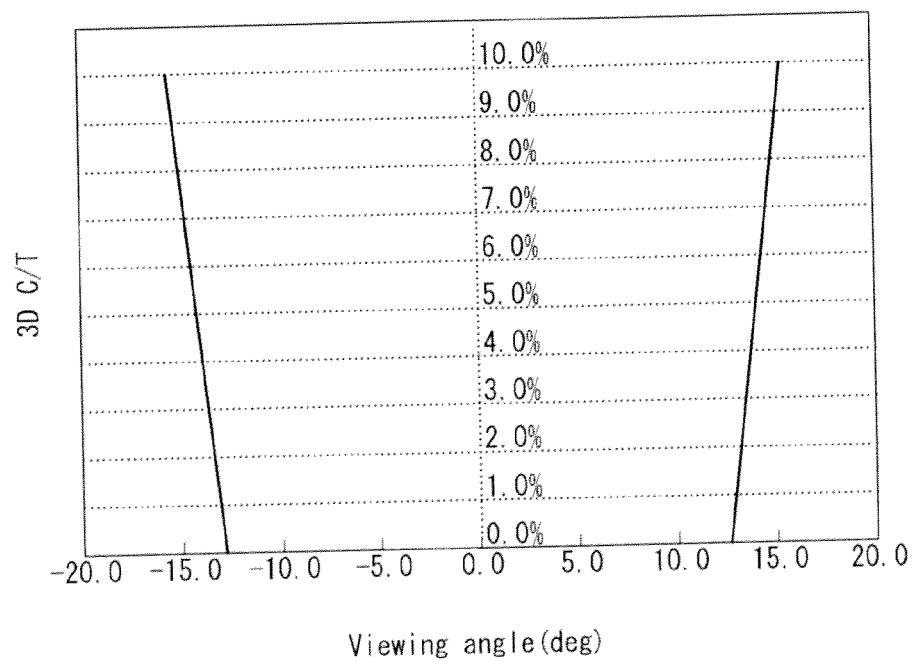
FIG. 9B is a simulation graph of a viewing angle of a stereoscopic image display according to example embodiments of the invention.

On the other hand, as shown in FIGS. 8B and 9B, in the stereoscopic image display according to the embodiment of the invention shown in FIG. 4, the adhesive layer and the first polarizing plate are sequentially positioned between the display panel and the patterned retarder. In the stereoscopic image display according to the embodiment of the invention, a thickness of the adhesive layer was about 25 μm, and a thickness of the first polarizing plate was about 30 μm.

Thus, in the stereoscopic image display according to the embodiment of the invention, a total thickness ranging from the display panel to the patterned retarder was about 55 μm, and a viewing angle obtained by the simulation result was about 29.6°.

In other words, the thickness ranging from the display panel to the patterned retarder in the stereoscopic image display according to the embodiment of the invention is reduced as compared the related art stereoscopic image display, thereby increasing the viewing angle by about 3.9°.

Figure 10A:
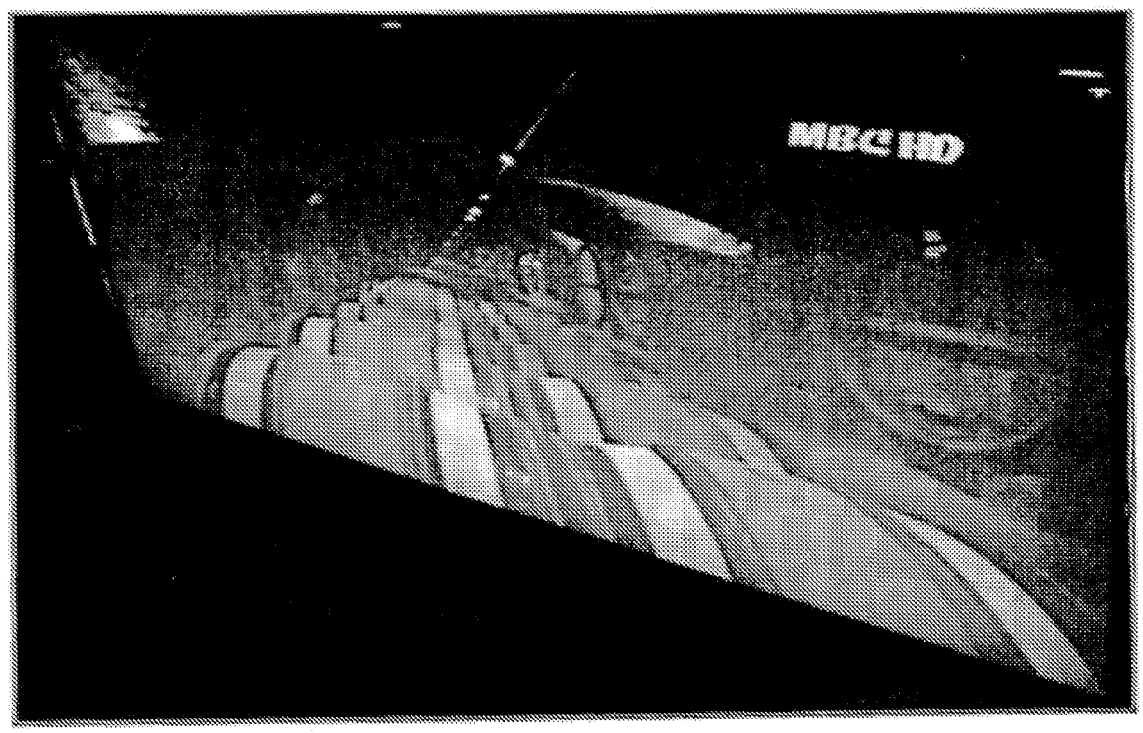
FIG. 10A is a photograph of an image implemented by a related art stereoscopic image display.
Figure 10B:
FIG. 10B is a photograph of an image implemented by the stereoscopic image display according to the second embodiment of the invention.
Figure 11A:
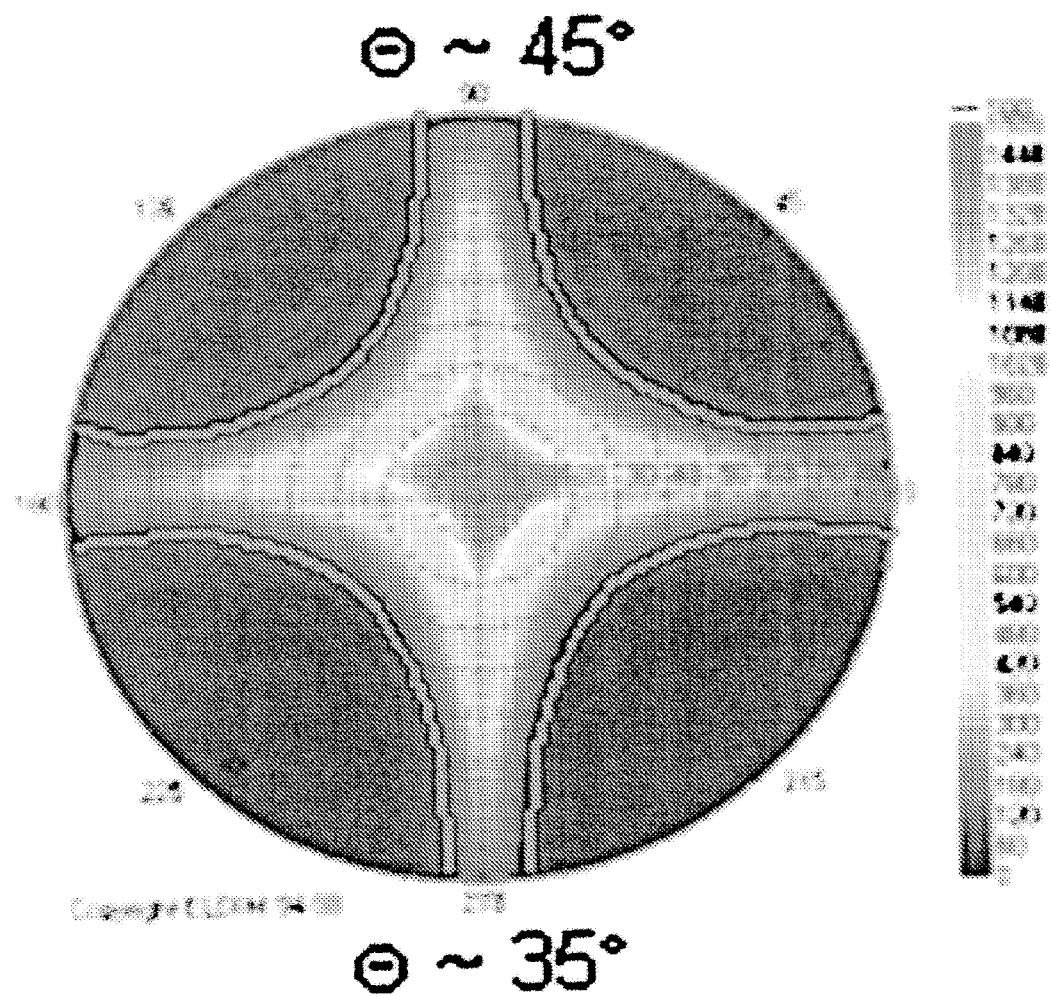
FIG. 11A is a photograph illustrating characteristics of a luminance and a viewing angle in a related art stereoscopic image display.

FIG. 10A is a photograph of an image implemented by the related art stereoscopic image display, and FIG. 10B is a photograph of an image implemented by the stereoscopic image display according to the second embodiment of the invention. FIG. 11A is a photograph of characteristics of a luminance and a viewing angle in the related art stereoscopic image display, and FIG. 11B is a photograph of characteristics of a luminance and a viewing angle in the stereoscopic image display according to the second embodiment of the invention.

As shown in FIGS. 10A and 10B, a contrast ratio of an image implemented by the stereoscopic image display according to the second embodiment of the invention was more excellent than an image implemented by the related art stereoscopic image display.

Figure 11B:
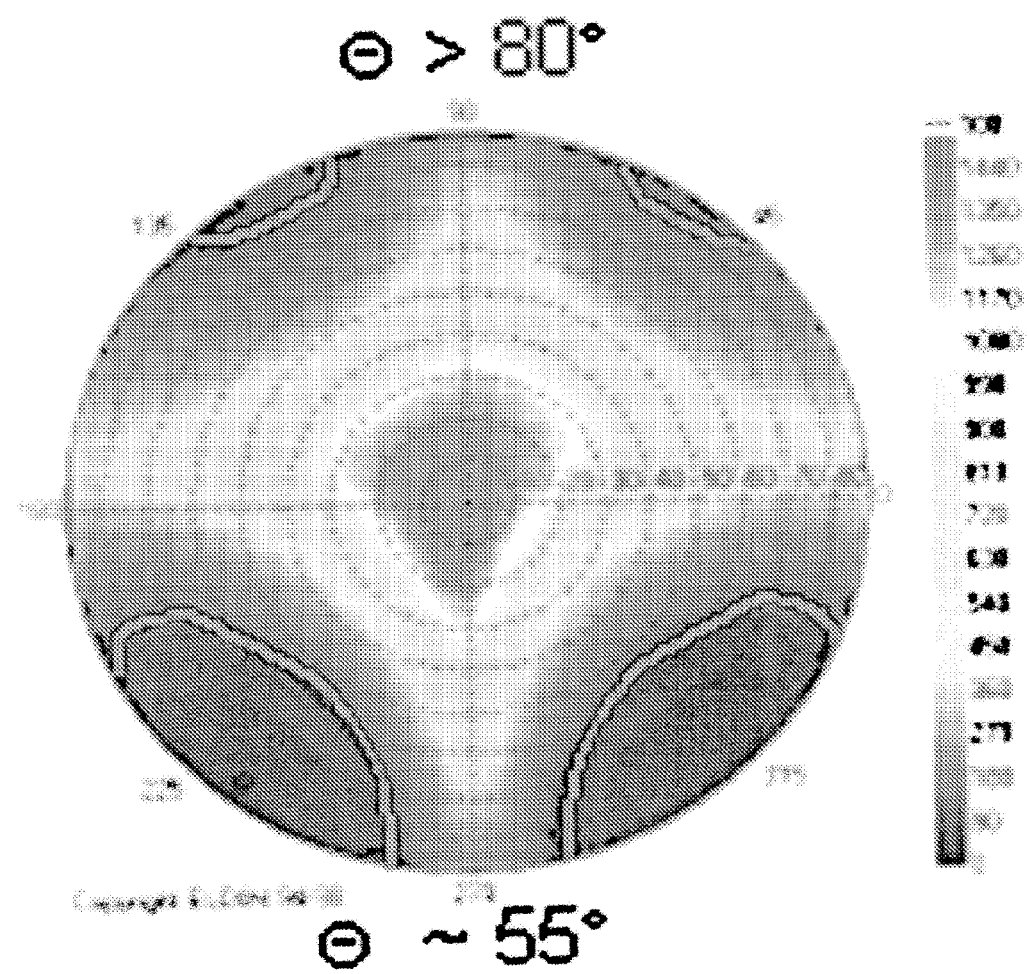
FIG. 11B is a photograph illustrating characteristics of a luminance and a viewing angle in the stereoscopic image display according to the second embodiment of the invention.

Further, as shown in FIGS. 11A and 11B, a viewing angle of the stereoscopic image display according to the second embodiment of the invention was wider than the related art stereoscopic image display.

As described above, the stereoscopic image display according to the embodiments of the invention forms the integral body of the patterned retarder and the first polarizing plate to remove the plurality of TAC films. Hence, the manufacturing yield ma may be improved, and the manufacturing cost may be reduced.

Furthermore, because the plurality of TAC films are removed, the thickness ranging from the display panel to the patterned retarder is reduced. Hence, the viewing angle of the stereoscopic image display according to the embodiments of the invention may widen, and the crosstalk may be reduced.

Furthermore, the stereoscopic image display according to the embodiments of the invention further includes the retardation film, thereby widening the viewing angle.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A stereoscopic image display comprising:
   a display panel;
   a first polarizing plate positioned on an upper surface of the display panel;
   a retardation film positioned between the display panel and the first polarizing plate;
   a patterned retarder positioned and directly formed on the first polarizing plate;
   a first cellulose triacetate (TAC) film positioned on the patterned retarder;

a second polarizing plate positioned on a lower surface of the display panel; and a second TAC film positioned under the second polarizing plate, wherein the retardation film is represented by a retardation value Rin and a refractive index nz of a thickness direction as indicated in the following Equations:

$$nz = \frac{nx - nz}{nz - ny}$$

$$Rin = (nx - ny)d$$

where 'nx' is a refractive index of an axis having a maximum refractive index in the in-plane direction, 'ny' is a refractive index of a vertical direction of the refractive index nx in the in-plane direction, 'nz' is a refractive index of a thickness direction, and 'd' is a thickness of the retardation film, and wherein the retardation film has a relationship of nx>nz>ny with respect to the refractive index, where 0<nz<1.

2. The stereoscopic image display of claim 1, further comprising a third TAC film positioned between the display panel and the second polarizing plate.

3. The stereoscopic image display of claim 1, wherein the display panel is driven in an ordinary mode (O-mode).

4. The stereoscopic image display of claim 1, wherein the retardation film is a Z-plate.

5. The stereoscopic image display of claim 1, further comprising a retardation film positioned between the display panel and the second polarizing plate.

6. The stereoscopic image display of claim 5, wherein the display panel is driven in an extra ordinary mode (E-mode).

7. The stereoscopic image display of claim 5, wherein the retardation film is a Z-plate.

8. The stereoscopic image display of claim 1, wherein the patterned retarder includes first retarder patterns and second retarder patterns, converts light of a left eye image passing through the first polarizing plate into a first polarization component, and converts light of a right eye image passing through the first polarizing plate into a second polarization component, wherein an optical axis of each of the first retarder patterns is perpendicular to an optical axis of each of the second retarder patterns.

* * * * *